(12) United States Patent
Porcheron et al.

(10) Patent No.: US 10,943,093 B2
(45) Date of Patent: Mar. 9, 2021

(54) METHOD AND SYSTEM FOR FACIAL FEATURES ANALYSIS AND DELIVERY OF PERSONALIZED ADVICE

(71) Applicant: CHANEL PARFUMS BEAUTE, Neuilly sur Seine (FR)

(72) Inventors: Aurélie Porcheron, Pantin (FR); Sandra Courreges, Pantin (FR); Emmanuelle Mauger, Pantin (FR); Frédérique Morizot, Pantin (FR)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 260 days.

(21) Appl. No.: 16/194,742

(22) Filed: Nov. 19, 2018

(65) Prior Publication Data
US 2019/0188457 A1    Jun. 20, 2019

(30) Foreign Application Priority Data

Dec. 20, 2017  (EP) .................................... 17306842

(51) Int. Cl.
*G06K 9/00* (2006.01)
*A45D 44/00* (2006.01)
*G06K 9/46* (2006.01)

(52) U.S. Cl.
CPC ....... *G06K 9/00281* (2013.01); *A45D 44/005* (2013.01); *G06K 9/00248* (2013.01); *G06K 9/4652* (2013.01); *A45D 2044/007* (2013.01)

(58) Field of Classification Search
CPC . G06T 2207/10024; G06T 2207/20092; G06T 2207/20208; G06T 5/009; H04N 19/186; H04N 5/347; H04N 5/37457; H04N 5/343; G06K 7/10722; G06K 7/10; G06K 9/00281; G06K 9/4652; G06K 9/00248; A45D 44/005; A45D 2044/007
USPC .......................................................... 382/118
See application file for complete search history.

(56) References Cited

U.S. PATENT DOCUMENTS

2012/0044355 A1    2/2012 Goto

FOREIGN PATENT DOCUMENTS

| EP | 2 962 597 | 1/2016 |
|---|---|---|
| JP | 2010-073222 | 4/2010 |
| JP | 5261586 | 8/2013 |

(Continued)

OTHER PUBLICATIONS

European Search Report, EP 17 30 6842, dated May 30, 2018.
(Continued)

*Primary Examiner* — Charlotte M Baker
(74) *Attorney, Agent, or Firm* — Nixon & Vanderhye

(57) ABSTRACT

Disclosed is a method for analyzing facial features of a person, including the steps of: acquiring a picture of the face of the person; delimiting, on the picture, at least two zones of the face of the person; processing the picture to determine contrast values of each of the at least two zones; and based on the determined contrast values, determining a cluster to which the person pertains among a plurality of pre-established clusters, with the pre-established clusters being elaborated based on a set of contrast values determined for the same zones of the faces of a reference population in respective pictures of the faces; and providing the person with personalized information, wherein the personalized information depends on the cluster to which the person pertains.

17 Claims, 5 Drawing Sheets

(56) References Cited

FOREIGN PATENT DOCUMENTS

WO    WO 2008/045521    4/2008

OTHER PUBLICATIONS

Jones et al., "Cosmetics Alter Biologically-Based Factors of Beauty: Evidence From Facial Constrast", Evolutionary Psychology, www.epjournal.net—2015. 13(1):210-229.

Aurélie Porcheron et al. "Aspects of Facial Contrast Decrease with Age and Are Cues for Age Perception", PL0S ONE, vol. 8, No. 3, Mar. 6, 2013 (Mar. 6, 2013), p. e57985, XP055479045, D0I: 10.1371/journal.pone.0057985, * Study 1; Study 2 (Results); Studies 3a and 3b (Discussion); General discussion * * abstract; figures 1, 3 *.

Russell et al., "Sclera Color Changes With Age and Is a Cue for Perceiving Age, Health, and Beauty", Psychology and Aging 2014, vol. 29, No. 3, 626-635.

Russell, "Why Cosmetics Work", Department of Psychology, Harvard University, Chapter for: The Science of Social Vision Text word count: 8010, Figure: 9.

Russell., "Sex, Beauty, and the Relative Luminance of Facial Features", Perception, 2003, vol. 32, pp. 1093-1107.

Russell., "A Sex Difference in Facial Contrast and Its Exaggeration by Cosmetics", Perception, 2009. vol. 38, pp. 1211-1219.

METHOD AND SYSTEM FOR FACIAL FEATURES ANALYSIS AND DELIVERY OF PERSONALIZED ADVICE

FIELD OF THE INVENTION

The invention relates to a method for analyzing facial features of a person, and a system configured for implementing said method. The invention also relates to the furniture of personalized information regarding make up and skin care.

BACKGROUND OF THE INVENTION

Studies have been conducted to evaluate the impact of facial contrasts on the perception features such as age, femininity or masculinity, or even the perception of good health condition.

By facial contrast, is meant the contrast between some characteristic features of the face such as the mouth, the eyes or eyebrows, and the neighboring skin.

For instance, it has been shown in the article Porcheron A, Mauger E, Russel R (2013), "Aspects of facial contrast decrease with age and are cues for age perception", PLoS ONE 8(3): e57985, doi:10.1371/journal.pone.0057985, that facial contrasts tends to decrease with age in a large sample of adult Caucasian female, and that the artificial increase of facial contrast led to a perception of younger women than they actually were.

According to another example, the article "Cosmetics alter biologically-based factors of beauty: evidence from facial contrast" by Alex L. Jones, Richard Russel and Robert Ward, in *Evolutionary Psychology*, Vol. 13, Issue 1, Jan. 1, 2015, discloses that the luminance contrast pattern of the eyes and eyebrows is sexually dimorphic, with females possessing lower eyebrow contrasts and higher eye contrast than males.

Cosmetic products are commonly used to change the appearance of facial features (such as skin, lips, eyebrows or eyelashes) in order to improve their aspect and render them more appealing. For instance the use of mascara can intensify the look of the consumer. However, the very wide diversity of make-up products and/or skin care products that are available to consumers can render quite complex the optimal choice of a specific product for a consumer, who does not necessarily knows which product would be more adapted to improve his appearance and meet his needs.

It is however often complicated for the consumers to identify their specific needs by themselves and find the adequate cosmetic solution. In many cases, the consumer may unknowingly select a product which is not designed to provide the characteristics desired by the consumer. In such case, the consumer may be dissatisfied with the result of the selected cosmetic product and disregard the brand.

Therefore it would be desirable to assist the consumers in their selection of the right cosmetic product according to its impact on each facial feature in order to ensure that the use of the selected product will provide the desired result (for instance, looking more feminine or younger).

DESCRIPTION OF THE INVENTION

In view of the above, one aim of the invention is to allow analysis of the facial features of a consumer to determine its needs.

Another aim of the invention is to allow providing a consumer with personalized advices according to its facial features.

To this end, a method for analyzing facial features of a person is disclosed, comprising the steps of:
  acquiring a picture of the face of the person,
  delimiting, on the picture, at least two zones of the face of the person,
  processing the picture to determine contrast values of each of the at least two zones,
  based on the determined contrast values, determining a cluster to which the person pertains among a plurality of pre-established clusters,
wherein the pre-established clusters are elaborated based on a set of contrast values determined for the same zones of the faces of a reference population in respective pictures of the faces, and
providing the person with personalized information, wherein the personalized information depends on the cluster to which the person pertains.

Preferably, each zone of a face of a person comprises a characteristic feature of a face chosen among the following group: mouth, eye, eyebrow, and hair, and each zone comprises at least one portion comprising said characteristic feature, and another portion comprising skin neighboring said characteristic feature.

Advantageously, the determination of contrast values of a zone of the face of a person then comprises measuring average contrast values, in the CIE L*a*b* color space, between the portion of the zone comprising the characteristic element and the portion of the zone comprising the skin neighboring said characteristic element.

More specifically, determination of contrast values of a zone of the face of a person may comprise determining an average contrast value, in each of the L, a and b coordinates of the CIE L*a*b* color space, between the portion of the zone comprising the characteristic element and the portion of the zone comprising the skin neighboring said characteristic element.

According to a preferred embodiment, the pre-established clusters are elaborated by:
  processing the set of contrast values of the zones of the faces of the reference population to obtain a set of data of reduced dimensions, and,
  clustering the set of data of reduced dimensions.

Preferably, the processing step is performed by applying principal components analysis on the set of contrast values.

In embodiments, the step of determining a cluster to which the person pertains may comprise:
  processing the contrast values of the zones of the face of the person to obtain corresponding coordinates in the reduced dimensions of the reference population, and
  deducing from the obtained coordinates the cluster to which the person pertains.

In embodiments, the step of delimiting at least two zones of the face of the person comprises delimiting between two and four zones of the face, each zone comprising one characteristic element of a face among the following group: mouth, eye, eyebrow and hair.

The personalized information provided to the person may comprise any of the following:
  advice regarding personalized modification of the contrast value of at least one zone of the face of the person,
  identification of at least one care or cosmetic product for personalized modification of the contrast value of at least one zone of the face of the person, simulation of the appearance of the face of the person with at least one contrast value of at least one zone of the face of the person changed compared with the picture of the person;

wherein said at least one zone of the face of the person is a zone comprising one characteristic element of the face chosen among the following group: mouth, eye, eyebrow, and hair.

In embodiments, the plurality of pre-established clusters may be elaborated based on a set of contrast values determined for three zones, each comprising one of the following features: eye, mouth and eyebrow.

In embodiments, the plurality of pre-established clusters may consist in three clusters.

In embodiments, the provided personalized information consists in recommending a modification of the contrast values according to any of the following rules:
 Increasing the mouth, eye and eyebrow contrast,
 Increasing the mouth and eye contrast,
 Increasing the eyebrow and eye contrast.

A computer program product is also disclosed, comprising instructions for executing steps of:
 processing at least one delimited zone of a picture to determine contrast values of the zone,
 processing the determined contrast values to obtain respective coordinates in reduced dimensions, and
 calculating the distances to barycenters of pre-established clusters, to infer a cluster to which the contrast values pertain,
when it is implemented by a calculator.

A system for analyzing facial features of a person is also disclosed, comprising:
 a picture input device,
 a calculator, and
 a memory,
characterized in that the memory stores a definition of clusters elaborated based on a set of contrast values determined for at least two zones of faces of a reference population, and in that the calculator is configured for implementing the method according to the preceding description.

In embodiments, the picture input device may comprise a camera and/or an interface for connecting the calculator with an external storage device.

Preferably, the system further comprises a display device adapted for displaying the personalized information.

In a preferred embodiment, the picture input device is a camera, the system comprises a photo studio comprising said camera, a screen or background of neutral color and a light, and the display device and the photo studio are installed in an shop or beauty salon.

The method according to the invention allows analyzing the facial contrasts of a person and determining, from these contrasts, a cluster among a plurality of pre-established clusters, to which the person belongs.

The comparison of facial contrasts of a person to a plurality of pre-established clusters gives information on which of the facial features of the person can be improved with make up in order to achieve desired results.

Indeed, the inventors found out that, no matter the age or ethnicity of a person belonging to a reference population, this reference population can be distributed between a plurality of clusters which are elaborated solely based on facial contrasts. Therefore the belonging of a person to a specific cluster indicates that this person exhibits facial contrasts which can be more or less pronounced relative to the other clusters, and thus create a specific facial contrast pattern.

This analysis allows in turn, according to the result that a person wishes to obtain, determining a zone of the face which contrast needs to be modified, and in what manner. In particular, dedicated rules are preferably defined for each cluster, indicating the way contrasts have to be changed in order to achieve a desired result. Cosmetic products can then be selected in a personalized manner according to their impact on facial contrasts.

The invention thus provides for personalized information of a consumer according to its facial contrasts.

DESCRIPTION OF THE DRAWINGS

Other features and advantages of the invention will be apparent from the following detailed description given by way of non-limiting example, with reference to the accompanying drawings, in which.

DETAILED DESCRIPTION OF AT LEAST ONE EMBODIMENT OF THE INVENTION

As will be explained in more details below, the invention allows analyzing facial features of a person, and in particular facial contrasts of the person, to determine a cluster to which the person belongs. The cluster is selected among a plurality of pre-established clusters, which are elaborated based on analysis of facial contrasts of a reference population.

It is therefore possible to determine the specificities of the facial contrasts of a person, and provide this person with personalized information according to the determined specificities.

System for Analyzing Facial Features

Figure 1A:
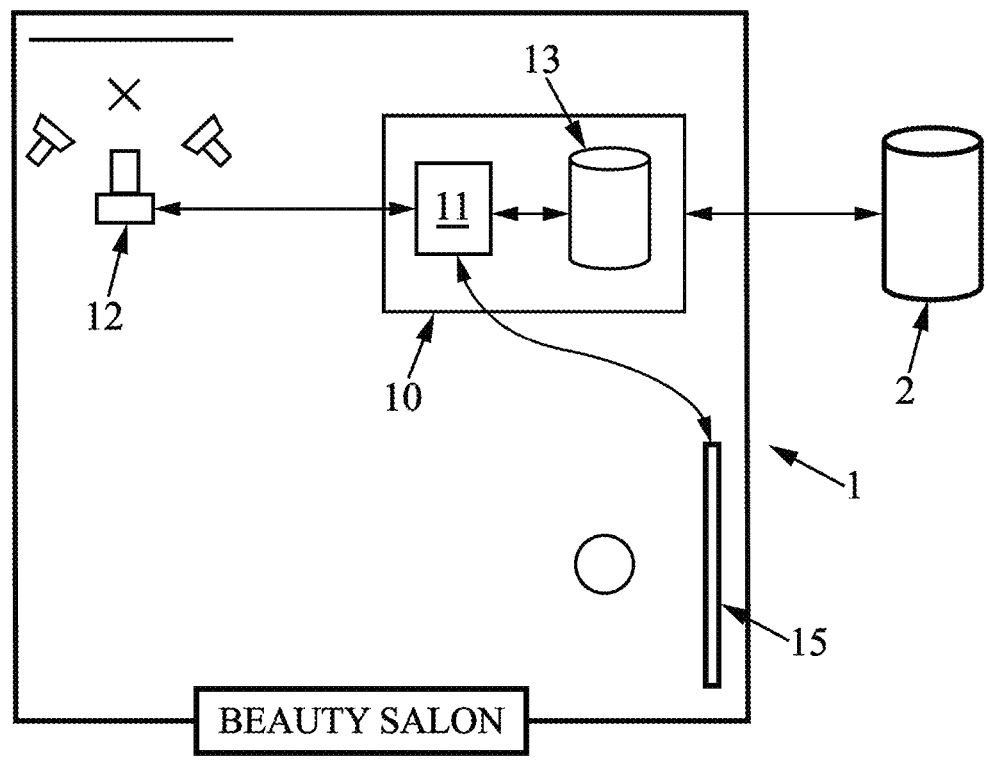
FIG. 1a is a schematic view of a first embodiment of a system for analyzing facial features of a person.
Figure 1B:
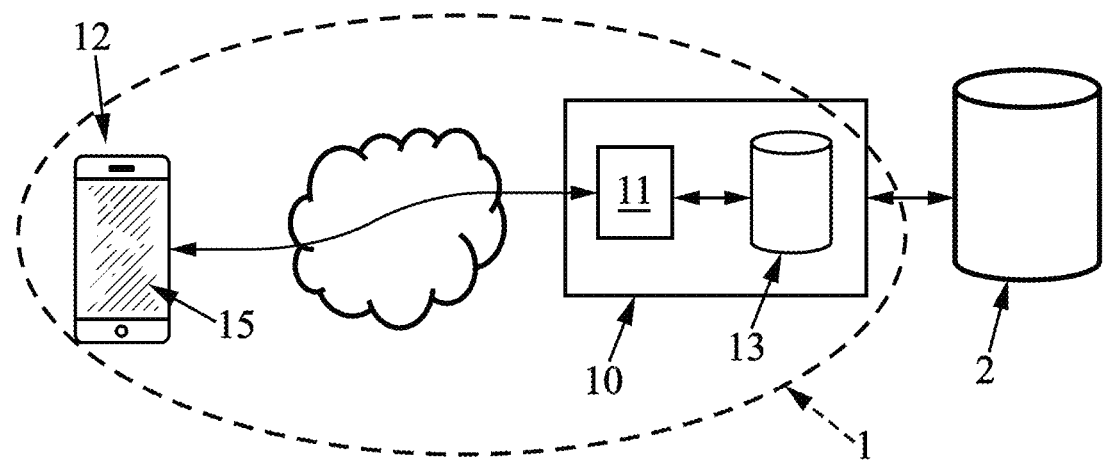
FIG. 1b is a schematic view of an alternative embodiment of a system for analyzing facial features of a person.

With reference to FIGS. 1a and 1b, a system 1 for analyzing facial features of a person is schematically shown.

This system comprises a processing unit 10 comprising a calculator 11 which is preferably a processor, a microprocessor, or can also be a microcontroller. The calculator 11 is adapted to execute code instructions to process pictures and data extracted from pictures, according to the method disclosed hereinafter.

The system also comprises a picture input device 12. The picture input device 12 may comprise a camera such as a digital camera, and an interface of the processing unit 10 for its connection to the camera. The interface can be a wired connector or a wireless interface if the processing unit 10 is located at a distance from the camera.

Preferably, the camera is colorimetrically calibrated.

The picture input device may also be an interface of the processing unit 10 for connecting an external storage device, in which pictures are stored. For instance, the processing unit 10 may comprise a USB port forming said picture input device 12.

The system 1 further comprises a memory 13. The memory preferably stores software instructions which, when executed by the calculator 11, allows the calculator 11 to perform the method detailed below.

In an embodiment, the memory 13 can be part of the processing unit 10. In an alternative embodiment, the memory can be separate from the processing unit 10 and located at a distance thereof. The memory can in that case be accessed by the processing unit by wireless connection. In that case, the processing unit 10 preferably comprises a communication interface for remote connection to the memory 13 through a telecommunication network such as the internet.

Last, the processing unit 10 is preferably connected to a database 2 comprising information about make-up and skincare products. Information about make-up and skincare products may comprise:

Type of the product,
commercial name of the product
Name of the brand marketing the product,
Color or color reference,
Sun protection factor,
Coverage degree,
Composition,
Size and/or capacity,
Price, etc.

The processing unit 10 can be connected to the database 2 by wired or preferably wireless connection, depending on the physical locations of the system 1 and database 2. Typically, the processing unit 10 may access the database via internet.

The system 1 also preferably comprises a display 15 which can be a screen, and in some embodiments a tactile screen.

In an embodiment schematically shown in FIG. 1a, the system may at least in part installed in a shop, a beauty salon, or any equivalent. In particular, the picture input device 12 and display 15 can be located in the shop or beauty salon.

The picture input device 12 is preferably a camera installed in a photo studio installed in the shop or beauty salon, and configured for taking pictures in controlled conditions. The photo studio may comprise a screen or background of neutral color (white, grey), at least one lamp such as a softbox, and the camera at a fixed location relative to the screen or background. The camera may be hidden behind a reflective glass such as a one-way mirror for a better integration in the shop or beauty salon.

In embodiments, the camera may be a video camera able to acquire a video, from which one or several pictures can be extracted.

The video or pictures taken with the camera or extracted from a video are transferred to the processing unit 10, which can be a computer located in the shop or beauty salon, or a remote server, for processing the pictures.

The display 15 is a screen located in the shop or beauty salon for displaying personalized information to a user according to the processing of the pictures sent to the processing unit.

In an alternative embodiment, the camera of the system is a digital camera of a mobile phone, tablet or smartphone, with which a user can take a picture of himself/herself. The picture is then transferred to the processing unit 10 for further processing.

In an embodiment, the processing unit 10 may be implemented in the mobile phone—in that case the calculator 11 is the processor of the phone, and the memory 13 may be a memory of the phone, and the memory stores an application software comprising code instructions for performing the method detailed below.

In another embodiment, the processing unit 10 may be a remote server, to which the phone sends the picture.

The display screen 15 of the mobile phone is then used to display personalized information to the user according to the result of the processing of the picture.

Method for Analyzing Facial Features

Figure 4:
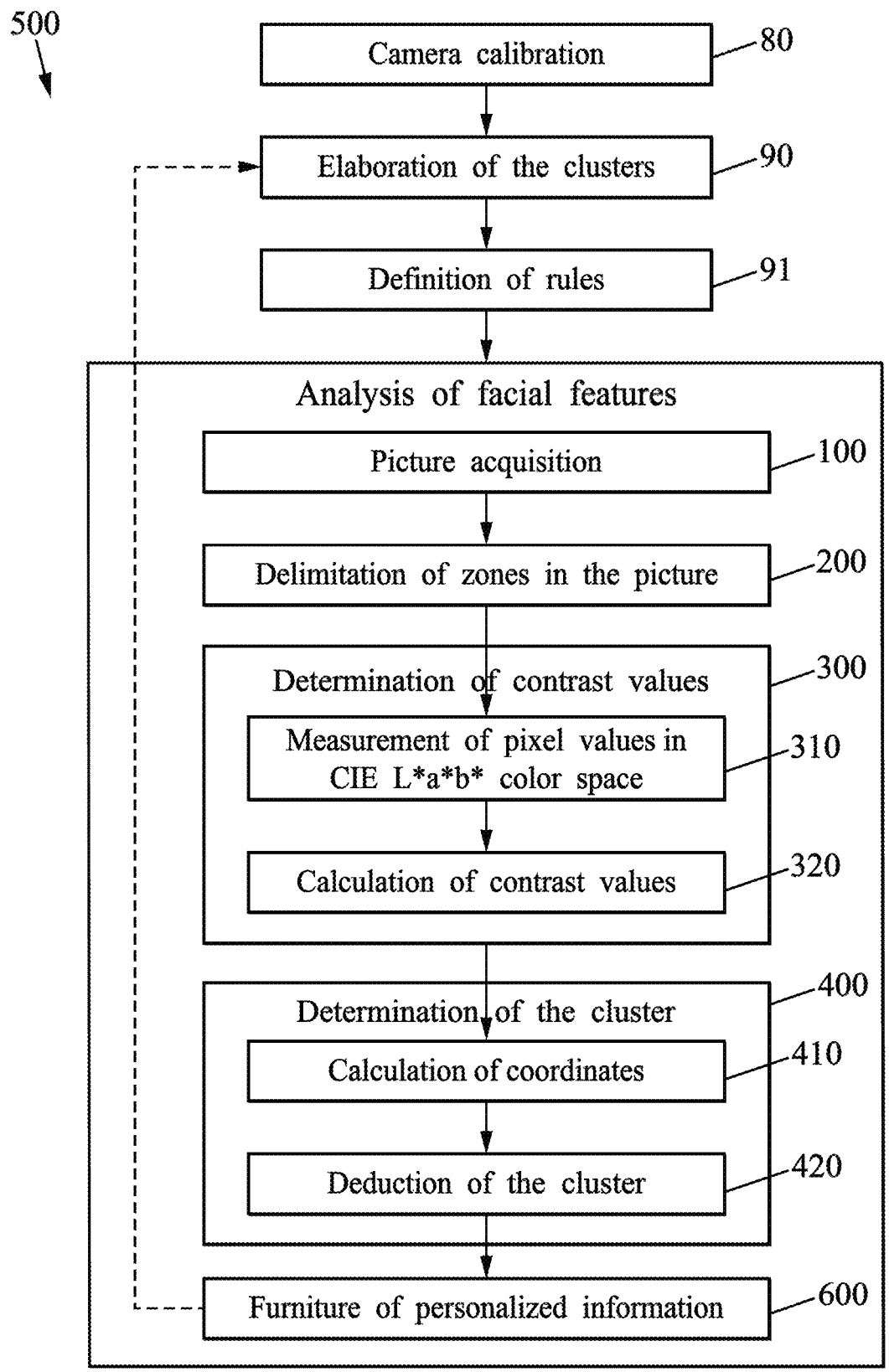

With reference to FIG. 4, a method for analyzing facial features of a person will now be described. It is implemented by the system disclosed above.

This method is based on analysis of facial contrasts of a person, said analysis being performed on a picture or a video of the face of the person.

The method thus comprises a first step 100 of acquiring a picture or a video of the face of a person. This step is preferably performed by acquiring the picture or the video with a camera 12 at the time of implementing the method, and transferring said picture to the processing unit 10. However it can also be performed by the processing unit 10 loading a picture that has been previously captured and then stored on a dedicated storage device.

Preferably, the picture that is acquired at step 100 is acquired according to determined acquisition conditions, in order to ensure good reproducibility of the processing that is then performed on the picture. In particular, the lighting of the face should prevent any shadow on the face, for instance the face should be lit frontally. Also, the height of the lights should be fixed and the height of the chair on which the person sits for taking the picture should be adjusted in order for the head of the person to be at a determined height.

According to a specific, yet non-limiting embodiment, the height of the camera was adjusted to the height of the face, and the face is illuminated by three flashes: one in front of the face (diffuse light), the height of this flash being adjusted to the height of the face, and two flashes illuminating the face from a 45° angle (direct light), the height of these flashes being also adjusted to the height of the face.

During picture acquisition, the person should also ensure that his/her hair does not hide some characteristic features of his/her face such as the mouth, the eyes and the eyebrows, for instance by wearing a headband, and ensuring that he/she wears no make-up or adornment The person is asked to keep its eyes open, keep a neutral expression and gaze directly into the camera.

Moreover, the picture is preferably colorimetrically calibrated. To this end, the camera 12 may be colorimetrically calibrated. Alternatively, a color chart may be used to calibrate the picture. In that case, the picture should be taken so as to include both the face of the person and the color chart. For instance, a color chart comprising a number of color patches may be used. Preferably, some of the patches may be designed to be similar to a range of skin tones in order to increase the precision of the calibration.

The analysis of the colors of the patches that appear on the picture can be compared with the actual color of the patches on the chart and a correction can be inferred from this comparison.

According to still another embodiment, the colorimetric calibration may comprise a preliminary step 80 performed on a number of calibration pictures. In that case, a number of calibration pictures (for instance 10 or 20) of faces are acquired, each picture including a color chart including various color patches, and preferably a number of patches designed to be similar to a range of skin tones. The $L^*a^*b^*$ parameters are then measured in the CIE $L^*a^*b^*$ color space defined in more details below, for each color patch in each image, and for each $L^*a^*b^*$ parameter of each of the color patches, the median value for the set of images is computed.

The color difference (ΔE1976) is then calculated for each color patch of each image relative to the corresponding median value, and the mean color difference (ΔE1976) value across the color patches is computed for each image. The image with the lower global color difference value is then selected as the reference image, and its color chart is set as the reference color chart. In another embodiment, contrast values may be determined in any other color space, such as LCH, RGB, CMYK, and the like.

Finally, during implementation of step 100, the picture is taken so as to include both the face of the person and the same color chart as used in the calibration step. The picture is then registered to the reference image by minimizing the differences between the image color chart and the reference image color chart. The color chart is then cropped to keep only the part of the picture that shows the face of the person.

According to an embodiment, the step 100 of acquiring the picture may comprise a substep of checking that the picture satisfies the desired acquisition conditions. This step may comprise for instance checking that there is no shadow or hidden characteristic feature of the face on the picture. If the picture is determined not to fulfill the desired conditions, then the person can be asked to acquire or load another picture. This substep may be performed by a visual check from an operator or may be implemented automatically by the calculator 11 running appropriate software.

The method then comprises a step 200 of delimiting at least two zones of the picture of the face, each zone comprising a characteristic feature of the face such as the mouth, an eye, a eyebrow, or part of the hair appearing on the picture. The number of zones delimited on the picture is preferably comprised between two and six. In any case, two zones cannot be delimited around the same characteristic features, but two zones can be delimited around two characteristic features of the same nature (two eyes or two eyebrows) to determine an average value for said feature.

Each zone Z is delimited to comprise a first portion $Z_1$ which comprises said characteristic feature, and a second portion $Z_2$ which comprises skin neighboring said characteristic feature.

Figure 2:
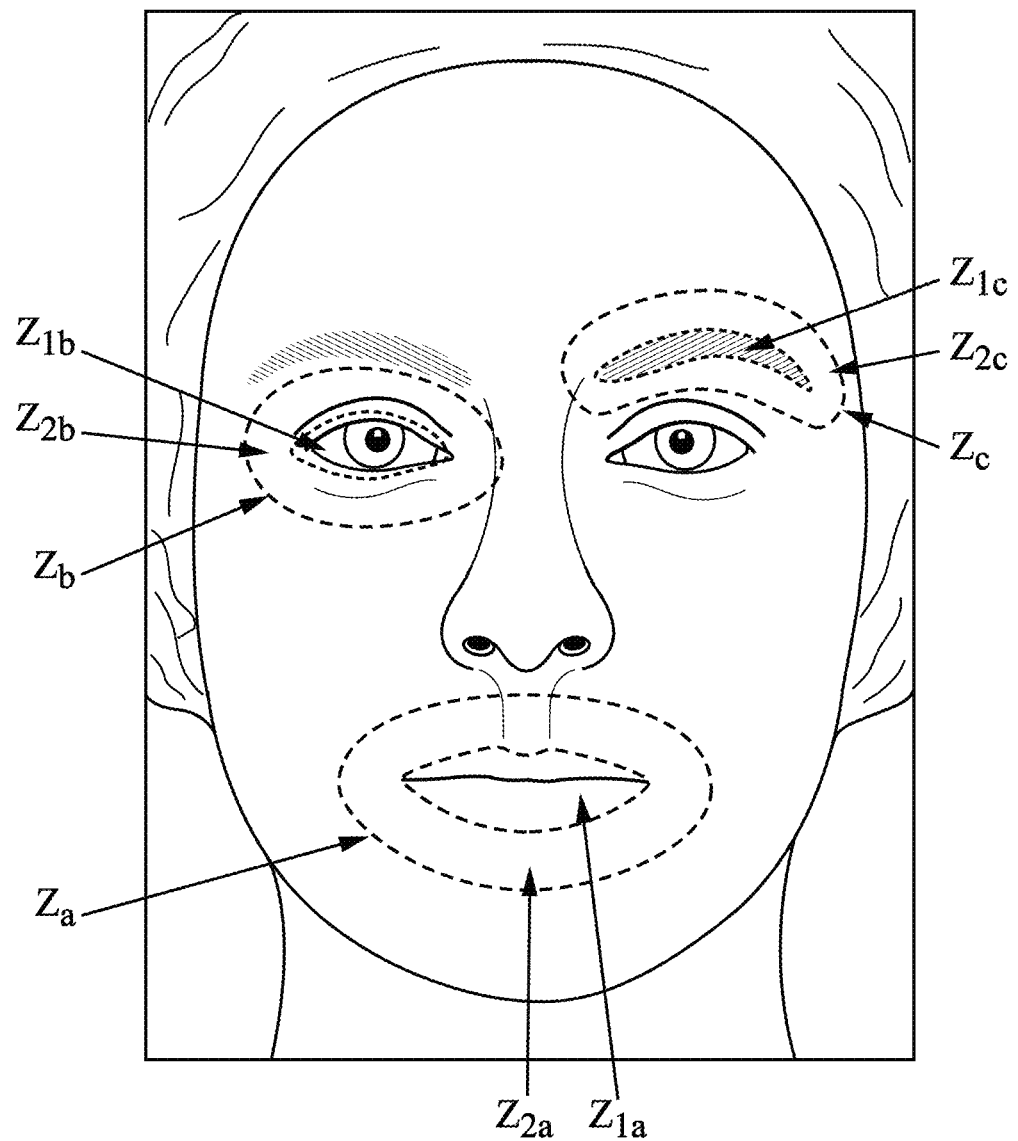
FIG. 2 shows an example of zones delimited on a picture of a face.

With reference to FIG. 2, three exemplary zones $Z_{a,b,c}$ are shown comprising a first zone $Z_a$ delimited around the mouth, a second zone $Z_b$ delimited around an eye, and a third zone $Z_c$ delimited around the eyebrow. One can see for each zone the portion $Z_{1a,b,c}$ comprising the characteristic feature and the portion $Z_{2a,b,c}$ comprising the neighboring skin.

These zones may be delimited manually by an operator using appropriate software executed by the calculator 11 such as, for example Matlab™. Alternatively, these zones may be delimited automatically, by detection of the characteristic features and delimitation of a zone around each characteristic feature, thanks to appropriate facial elements detection software.

For a determined zone Z, the area of the portion $Z_1$ of the zone comprising only the characteristic feature is comprised between 5 and 40% of the total area of the zone, and preferably between 10 and 35% of the total area of the zone, for example between 18 and 25% of the total area of the zone. The area of the portion $Z_2$ comprising the neighboring skin is thus comprised between 60 and 95% of the total area of the zone, preferably between 65 and 90% of the total area of the zone, for example between 75 and 82% of the total area of the zone.

The method then comprises a step 300 of processing the picture to determine facial contrast values of the person. More particularly, the processing step is performed on the delimited zones to determine contrast values of said zones.

To this end, at least one pixel value of each portion $Z_1$, $Z_2$ of each zone is measured during a substep 310, in the CIE L*a*b* color space, in which the L* coordinate corresponds to a luminance degree, varying on a 1-100 scale between black and white, the a* coordinate varies along an axis between red and green, on a 0-255 (or alternatively −100;+100 or −127;+127) scale from green (0) to red (255), and the b* coordinate varies along an axis between blue and yellow, on a 0-255 (or alternatively −100;+100 or −127;+127) scale from blue (0) to yellow (255).

Preferably, all pixel values in all three L*, a*, and b* coordinates are measured for each portion Z1, Z2 of each zone, and the values are then averaged over the whole portion.

For example, luminance values of all pixels within a portion Z1 of a zone corresponding to an eye of the person are averaged, and luminance values of all pixels within a portion Z2 of the corresponding zone are also averaged. The same is carried out for the other coordinates a* and b* for the same zone.

A contrast value is then calculated during a substep 320 for each feature (i.e. each delimited zone of the picture) and for each coordinate in the CIE L*a*b* color space.

For instance, a contrast value for luminance can be computed for each feature by the following equation:

$$C_{f,L} = \frac{L(\text{skin}) - L(\text{feature})}{L(\text{skin}) + L(\text{feature})}$$

Where L(skin) is a Luminance value of at least one pixel of the portion $Z_2$ comprising the skin neighboring the feature, L(feature) is a Luminance value of at least one pixel of the portion $Z_1$ comprising the feature, and $C_{f,L}$ is the contrast value for Luminance of the feature. According to a preferred embodiment, L(skin) is the averaged luminance value of all the pixels of the portion Z2, and L(feature) is the averaged luminance value of all the pixels of the portion Z1.

Following the same definition, a contrast value for the a* coordinate can be computed for each feature by the following equation:

$$C_{f,a} = \frac{a(\text{skin}) - a(\text{feature})}{a(\text{skin}) + a(\text{feature})}$$

where a(skin) is a value according to the a* coordinate of at least one pixel of the portion Z2 comprising the skin neighboring the feature, and preferably is an average a* value of all the pixels in said portion, and a(feature) is the value according to the a* coordinate of at least one pixel of the portion Z1 comprising the feature, and preferably is the average a* value of all the pixels of said portion.

A contrast value for the b* coordinate is also computed for each feature by the following equation:

$$C_{f,b} = \frac{b(\text{skin}) - b(\text{feature})}{b(\text{skin}) + b(\text{feature})}$$

where b(skin) is a value according to the b* coordinate of at least one pixel of the portion Z2 comprising the skin neighboring the feature, and preferably is an average b* value of all the pixels in said portion, and b(feature) is the value according to the b* coordinate of at least one pixel of the portion Z1 comprising the feature, and preferably is the average b* value of all the pixels of said portion.

At least six, and at most eighteen contrast values are thus determined (three coordinates for two to six zones of the picture corresponding to two to six respective characteristic features of the face). In the case where two zones are delimited around characteristic features of the same nature (two eyes or two eyebrows) the average value of contrast is chosen for each coordinate. In this case, the average value is calculated by adding both values and then dividing by two.

The method then comprises a step 400 of determining, from the measured contrast values and a plurality of pre-established clusters, a cluster to which the person pertains.

To this end, a description of how the pre-established clusters are elaborated will now be made. The elaboration of the clusters can also be performed by the calculator 11, as a preliminary step 90 of the method.

Clusters are elaborated based on contrast values of faces of a reference population. To this end, pictures of faces of a reference population are acquired, preferably in the same conditions that have already been detailed regarding step 100 of the method. The reference population can comprise person of various ethnicities, ages, health conditions, male or female, etc. However, for a more precise clustering a reference population can comprise only people of the same sex and/or people of one country or from one ethnicity, or people from a determined age group.

Then, for each picture of a face, from two to six zones are delimited according to the definition of the zones that has been given regarding step 200 of the method, and contrast values are computed for each zone of each picture according to the implementation of step 300.

Let N be the number of pictures of the reference population that are processed for establishing the clusters, then the numbers of contrast values is comprised between 6N and 18N. If two zones of the same nature have been delimited in step 200 (two eyes or two eyebrows), the average contrast values are calculated to have one value per feature. These data are then processed by statistical analysis to identify the correlations between them.

Preferably, the processing comprises performing a principal component analysis on the set of contrast values, in order to reduce the number of dimensions of the data by identifying axes of higher correlation between values. Preferably, the number of dimensions is reduced to two dimensions. In other words, the set of data is projected into a bidimensionnal space, because it allows an easy visualization of the correlations between data points.

The set of projected data is then used for defining a plurality of clusters. To this end, a classification method (or clustering method) is applied on the set of projected data. Preferably, the classification method is hierarchical cluster analysis or HCA, and more preferably is Ward's method. According to alternative embodiments, clusters can be defined through implementation of the k-means method, k-medoid method or Density-based spatial clustering of applications with noise (DBSCAN) method.

The definition of the clusters is stored in the memory 13. For instance the memory may store a representation of the clusters' borders on a graph, or a mathematical definition of the clusters' borders.

Preferably, once the clusters have been elaborated, a subsequent step 91 is performed in which each cluster is associated to one or a plurality of rules establishing, for each cluster, which contrasts have to be amended, and in what way, according to various objectives to be achieved, and/or requirements to respect.

The objectives to be achieved can be for instance: making the person look younger, healthier, more attractive, or more feminine. The notion of femininity, age, health or attraction can be different from one culture to another, which may greatly impact how to interpret the resulting look. Therefore, resulting rules may vary according to local specificities.

The requirements can relate to a specific type of makeup to be applied, such as nude makeup, day or night makeup, application of a specific trend, etc.

The definition of the rules according to the clusters can be performed as follows. A person belonging to a determined cluster is madeup by a professional according to a specific objective and defined makeup requirements. The contrasts of the face of the person are measured before and after makeup to infer a rule about which contrasts need to be changed, and in what way.

The same is preferably repeated on different persons, professionals or not, but preferably by different makeup professionals, for a better definition of the rules. As many rules as combinations between objectives and makeup requirements can be defined that way, and a default rule may also be defined for each cluster in absence of objective and makeup requirement.

Preferably, the rules associated to each clusters are also stored in the memory 13.

An example of cluster and associated rules definition will now be described in reference to FIG. 3.

According to this example, clusters have been defined on a reference population composed 600 women of various ethnicities including 289 Caucasian, 175 Latin American, and 136 Asian, and of ages ranging between 20 and 70.

In each picture of a face of the reference population, three zones have been defined, comprising one zone delimited around the mouth, two zones delimited around the eyes and two zones delimited around the eyebrows. Contrast values have been determined according to the above description, and the contrast values have then been processed with principal component analysis to define three clusters.

The clusters correspond to categories of contrast values in the CIE L*a*b* coordinates space of more or less importance. According to this specific example, the clusters have been defined as shown in table 1:

TABLE 1 definition of clusters according to contrast values

| | Cluster 1 | Cluster 2 | Cluster 3 |
|---|---|---|---|
| Relatively higher contrast value (than other clusters) | a* eye, b* mouth | L* eye, L* eyebrow, a* eye, a* eyebrow, b* eye, b* eyebrow | L* mouth, a* mouth (absolute value of the contrast) |
| Intermediate contrast value | a* eyebrow, b* eye, b* eyebrow | a* mouth (abs), b* mouth | L* eye, L* eyebrow |
| Relatively lower contrast value (than other clusters) | L* eye, L* mouth, L* eyebrow, a* mouth (absolute value of the contrast) | L* mouth | A* eye, a* eyebrow, b* eye, b* mouth, b* eyebrow |

Figure 3A:
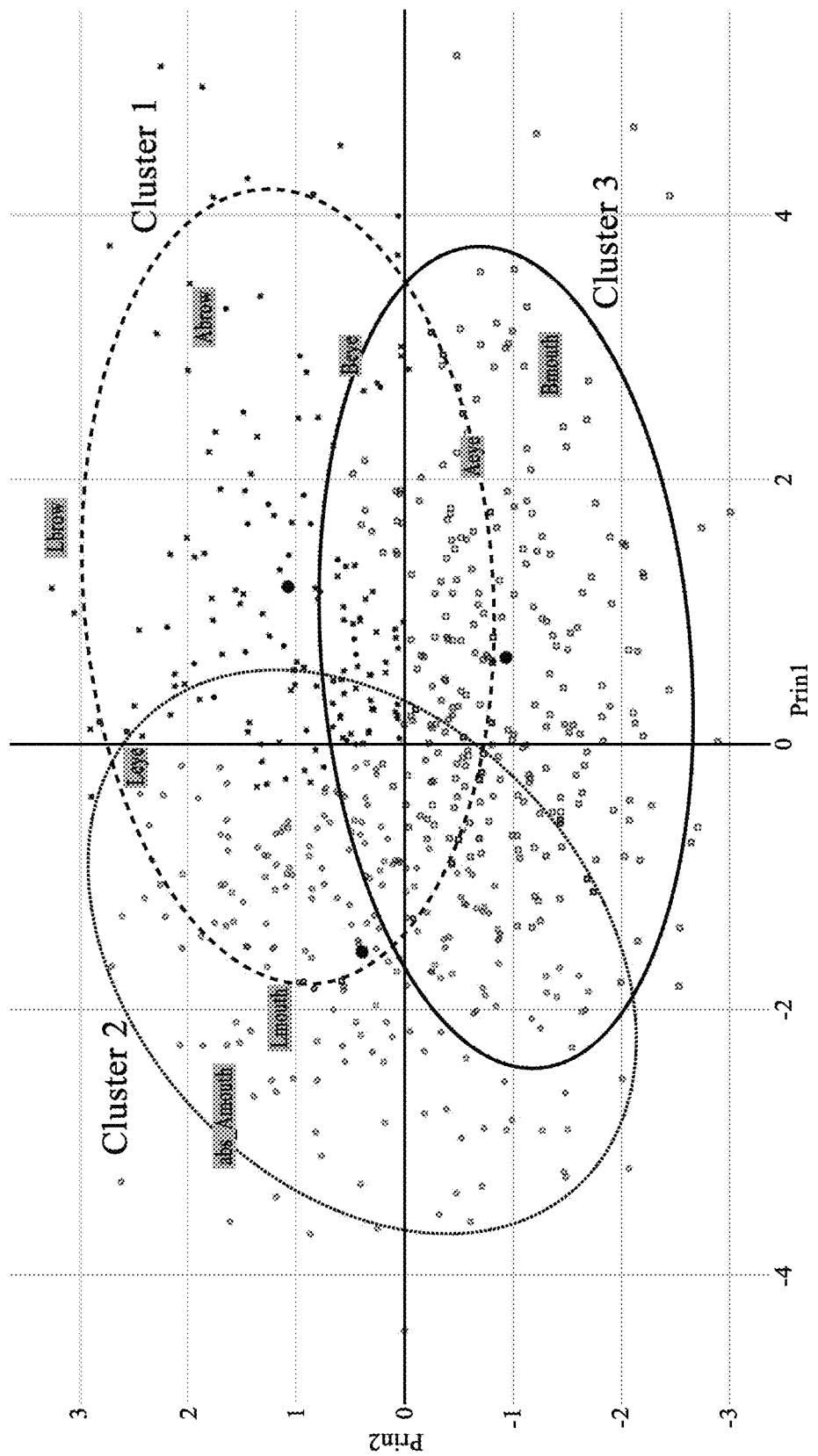
FIG. 3a shows clusters established based on an exemplary reference population.

In FIG. 3, the various shapes of the dots correspond to the various ethnicities of the women composing the reference population, and the clusters are delimited by the ellipses. The indications such as "Leye" or "Lmouth" correspond to areas of the graph of higher values for the respective contrasts.

Then a group of persons equally distributed in the various clusters was selected, and makeup professionals were asked to makeup each person with the same objective of making the person more feminine.

Figure 3B:
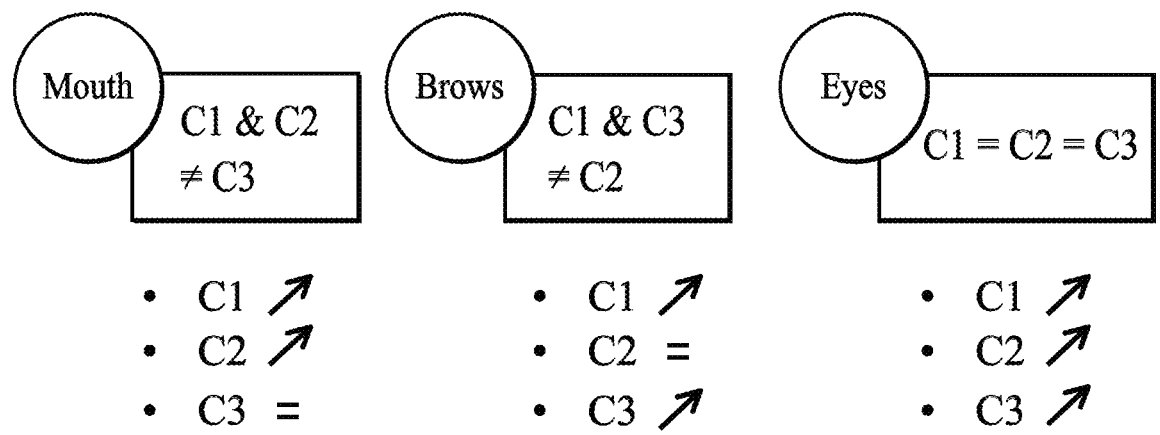
FIG. 3b shows the difference in contrast variations between clusters for a same type of makeup, FIG. 4 schematically shows the main steps of a method for analyzing facial features of a person according to one embodiment of the invention.

The contrasts were then measured for each person and compared to the initial values of the contrasts for the same person. With reference to FIG. 3b, the comparisons showed that:

for all three clusters, the eye contrasts were increased by the makeup,
for clusters 1 and 2, the mouth contrasts were increased while for cluster 3 they were not changed, and
for clusters 1 and 3, the eyebrow contrasts were increased while for cluster 2 they were not changed.

Based on these results, rules could be defined as follows, with the objective of making a person more feminine:

for cluster 1, increasing the mouth, eye and eyebrow contrast,
for cluster 2, increasing the mouth and eye contrast,
for cluster 3, increasing the eyebrow and eye contrast.

Back to FIG. 4 and the step 400 of determining a cluster to which the person belongs, the contrast values that have been determined from the picture of the face of the person are processed during a substep 410 to calculate the coordinates in the reduced dimensions of the reference population—for instance in the reduced dimensions of the PCA performed on the contrast values of the reference population, and then be positioned on a graph representing the clusters. The coordinates are calculating using the linear combination of eigenvectors resulting from the PCA on the new contrasts values.

The method then comprises a substep 420 of inferring, from the values of reduced dimensions and the definition of the clusters, the cluster to which the person belongs. For instance, according to the position of the point in the graph, one can infer the cluster to which the person belongs by calculating the distances to the clusters' barycenters and affect the person to the closest one.

According to a preferred, yet optional embodiment, the memory 13 not only stores the definition of the clusters but also all the data of reduced dimension of the reference population, and the method comprises an additional step 500 of adding to this set the data of reduced dimension corresponding to the person from which a picture has been taken. This step then also comprises running another time the clustering algorithm to update the definition of the clusters. In embodiments, this step 500 may only be performed periodically in order to add at the same time the sets of data obtained from a plurality of persons.

This iterative update of the clusters definition allows the clusters to be more precise, as the quantity of data used for their definition increases.

Therefore according to this embodiment, the calculator 11 is also configured to implement the clustering algorithm, through execution of appropriate software. In that case the processing unit 10 is preferably a dedicated remote server that is adapted to receive data from a plurality of stores, beauty salons, or individual users.

As the definition of the clusters may change, the definition of the associated rules may also be updated accordingly.

According to the cluster to which the person belongs, one can therefore determine which contrast values of the person are relatively low or high, and thus which contrast values can be selectively changed by application of appropriate makeup. In particular, the identification of the cluster to which the person belongs allows determining the corresponding rule to be applied for making up the person. For instance, if the person wishes a day makeup that makes her more feminine, the corresponding rule adapted to her cluster can be selected.

The method thus comprises a step 600 or providing the person with personalized information. The information is preferably provided on the display 15.

The provided information can comprise the cluster to which the person belongs, and/or the indication of which contrast values of the person are relatively low or high.

Moreover, information can also comprise, according to a result the person wishes to obtain (for example looking more feminine or younger) and the cluster to which it belongs, the corresponding makeup rule, which can be translated into advice regarding personalized modification of the contrast value of at least one zone of the face of the person. This advice can refer to a specific zone of the face to make-up, or examples of shades that the person can use to make-up a zone.

For example, if the person belongs to a cluster corresponding to relatively low luminance contrast value for the mouth, and high contrast values of the eyes and eyebrows, and if the person wishes to look more feminine, she can be advised to make up preferably her mouth to increase its luminance contrast value.

Preferably, information may also comprise a list or selection of make-up products or skin care products (for instance skin whitening product) which allow achieving the personalized modification of the contrast values that is recommended to the person.

For instance, the shades of a selection of make-up products can be determined according to $L^*$, $a^*$ and $b^*$ contrast values of the person.

Using the previous example, the selection of products may comprise a list of lipstick of various shades which all allow increasing the luminance contrast value.

The recommended make-up or skin care product may also be a personalized product, having composition and/or shade designed specifically according to the recommendations given to the person to achieve the personalized modification of the contrast values, and manufactured upon order by the person.

The products can be selected by the processing unit 10 in the database 2 of cosmetic products according to the information available on each product and the results of the analysis of facial features of the person. For instance, the processing unit may infer from the result of the analysis a type and shade of make-up which is desirable for the person and query in the database the products corresponding to this type and shade.

Last, information may also comprise a simulation of the appearance of the face of the person with at least one contrast value of at least one zone of the face of the person changed compared with the picture of the person. In particular, the person can be shown a simulation of the appearance of its face which contrast values have been changed according to a rule corresponding to the cluster to which the person belongs. Application of one make-up product selected from a personalized selection of products may also be simulated. The simulation may be performed by the calculator 11 and displayed on the display 15.

According to this personalized information, the person knows better which type or shade of make-up product can be used to obtain a desired result.

The invention claimed is:

1. A method for analyzing facial features of a person, comprising the steps of:
acquiring (100) a picture of the face of the person,
delimiting (200), on the picture, at least two zones of the face of the person, processing (300) the picture to determine facial contrast values of each of the at least two zones (Z), based on the determined facial contrast values, determining (400) a cluster to which the person pertains among a plurality of pre-established clusters, wherein the pre-established clusters are elaborated based on a set of facial contrast values determined for the same zones of the faces of a reference population in respective pictures of the faces, and providing (500) the person with personalized information, wherein the personalized information depends on the cluster to which the person pertains.

2. A method according to claim 1, wherein each zone (Z) of a face of a person comprises a characteristic feature of a face chosen among the following group: mouth, eye, eyebrow, and hair, and each zone comprises at least one portion ($Z_1$) comprising said characteristic feature, and another portion ($Z_2$) comprising skin neighboring said characteristic feature.

3. A method according to claim 2, wherein determination (300) of facial contrast values of a zone of the face of a person comprises measuring (310) average contrast values, in the CIE L*a*b* color space, between the portion ($Z_1$) of the zone comprising the characteristic element and the portion ($Z_2$) of the zone comprising the skin neighboring said characteristic element.

4. A method according to claim 3, wherein determination of facial contrast values (310) of a zone of the face of a person comprises determining an average contrast value, in each of the L, a and b coordinates of the CIE L*a*b* color space, between the portion ($Z_1$) of the zone comprising the characteristic element and the portion ($Z_2$) of the zone comprising the skin neighboring said characteristic element.

5. A method according to claim 3, wherein the pre-established clusters are elaborated (90) by:

processing the set of facial contrast values of the zones of the faces of the reference population to obtain a set of data of reduced dimensions, and, clustering the set of data of reduced dimensions.

6. The method according to claim 5, wherein the processing step is performed by applying principal components analysis on the set of contrast values.

7. The method according to claim 5, wherein the step (400) of determining a cluster to which the person pertains comprises:

processing (410) the facial contrast values of the zones of the face of the person to obtain corresponding coordinates in the reduced dimensions of the reference population, and deducing (420) from the obtained coordinates the cluster to which the person pertains.

8. The method according to claim 1, wherein the step (200) of delimiting at least two zones (Z) of the face of the person comprises delimiting between two and four zones of the face, each zone comprising one characteristic element of a face among the following group:

mouth, eye, eyebrow and hair.

9. The method according to claim 1, wherein the personalized information provided to the person comprises any of the following:

advice regarding personalized modification of the facial contrast value of at least one zone of the face of the person, identification of at least one care or cosmetic product for personalized modification of the facial contrast value of at least one zone of the face of the person, simulation of the appearance of the face of the person with at least one contrast value of at least one zone of the face of the person changed compared with the picture of the person;

wherein said at least one zone of the face of the person is a zone comprising one characteristic element of the face chosen among the following group: mouth, eye, eyebrow, and hair.

10. The method according to claim 1, wherein the plurality of pre-established clusters is elaborated based on a set of contrast values determined for three zones (Z), each comprising one of the following features: eye, mouth and eyebrow.

11. The method according to claim 1, wherein the plurality of pre-established clusters consists in three clusters.

12. The method according to claim 1, wherein provided personalized information consists recommending a modification of the facial contrast values according to in any of the following rules:

Increasing the mouth, eye and eyebrow contrast,

Increasing the mouth and eye contrast,

Increasing the eyebrow and eye contrast.

13. A computer program product embodied on a non-transitory computer-readable medium, the product comprising instructions for executing:

processing at least one delimited zone of a picture to determine facial contrast values of the zone;

processing the determined facial contrast values to obtain respective coordinates in reduced dimensions; and calculating the distances to barycenters of pre-established clusters, to infer a cluster to which the facial contrast values pertain, when the computer program product embodied on the non-transitory computer-readable medium is implemented by a calculator.

14. A system (1) for analyzing facial features of a person, the system comprising:

a picture input device;

a calculator comprising a processor, a controller, or a microcontroller; and a memory configured to store a definition of clusters elaborated based on a set of contrast values determined for at least two zones of faces of a reference population, the calculator being configured to implement the method according to claim 1.

15. The system according to claim 14, wherein the picture input device comprises one or more of a camera and an interface to connect the calculator with an external storage device.

16. The system according to claim 14, further comprising a display device configured to display the personalized information.

17. The system according to claim 14, wherein the picture input device is a camera, and the system further comprises a photo studio comprising said camera, a screen or background of neutral color and a light, and wherein the display device and the photo studio are installed in a shop or beauty salon.

\* \* \* \* \*